United States Patent
Beiser

[19]

[11] Patent Number: 6,012,816
[45] Date of Patent: Jan. 11, 2000

[54] OPTICAL PROJECTION APPARATUS AND METHOD

[76] Inventor: Leo Beiser, 151-77 28th Ave., Flushing, N.Y. 11354

[21] Appl. No.: 08/946,255

[22] Filed: Oct. 7, 1997

Related U.S. Application Data

[60] Provisional application No. 60/027,966, Oct. 8, 1996.

[51] Int. Cl.[7] .................................................. G03B 21/14
[52] U.S. Cl. ............................ 353/122; 385/116; 353/10
[58] Field of Search ................................. 353/10, 69, 70, 353/122; 359/207, 443, 448, 460, 478; 348/745, 746, 747, 804; 385/116, 119, 121

[56] References Cited

U.S. PATENT DOCUMENTS

| | | | |
|---|---|---|---|
| 1,932,082 | 10/1933 | Newcomer | 88/47 |
| 3,212,397 | 10/1965 | Miller | 88/24 |
| 3,339,454 | 9/1967 | Weiner | 88/24 |
| 3,508,822 | 4/1970 | Cornell et al. | 353/69 |
| 3,655,260 | 4/1972 | Bartucci et al. | 350/45 |
| 3,832,046 | 8/1974 | Mecklenborg | 352/69 |
| 4,116,739 | 9/1978 | Glenn | 156/169 |
| 4,208,096 | 6/1980 | Glenn, Jr. | 350/96 |
| 4,428,676 | 1/1984 | Chastang et al. | 356/354 |
| 4,929,066 | 5/1990 | Wakimoto et al. | 350/415 |
| 5,220,363 | 6/1993 | Sato et al. | 353/69 |
| 5,274,406 | 12/1993 | Tejima et al. | 353/70 |
| 5,381,502 | 1/1995 | Veligdan | 385/115 |
| 5,422,691 | 6/1995 | Ninimiya et al. | 353/69 |
| 5,455,882 | 10/1995 | Veligdan | 385/116 |
| 5,668,907 | 9/1997 | Veligdan | 385/120 |

OTHER PUBLICATIONS

"Ten Inch Planar Optic Display", L. Beiser & J. Veligdan, presented at SPIE Symposium, Orlando, Florida, Apr. 10, 1996. Published in SPIE Proc., vol. 2734, pp. 57–63 (1993).
"Telecentric Wide Angle Lens For LCD Rear Projection", J. Brian Caldwell, Optics & Photonics News, Aug. 1997.

*Primary Examiner*—William Dowling
*Attorney, Agent, or Firm*—Martin M. Novack

[57] ABSTRACT

Certain optical imaging systems exhibit disparate vertical and horizontal image focal surfaces; at least one of which is tipped with respect to the optical axis. The projection optics which illuminates such systems must provide that the vertical image components focus upon the nominal vertical image surface, while the horizontal image components focus on the disparate horizontal image surface. Because at least one of these image surfaces may be tilted with respect to the projection axis, correction is required to maintain focus over the entire image surfaces and to eliminate keystoning. The system may also require differing vertical and horizontal image magnifications as projected upon the above disparate focal surfaces. This invention describes, inter alia, the techniques for meeting these varied requirements; to project a rectilinear object field such that it forms a final focused rectilinear image in a system having tipped and disparate image planes.

21 Claims, 4 Drawing Sheets

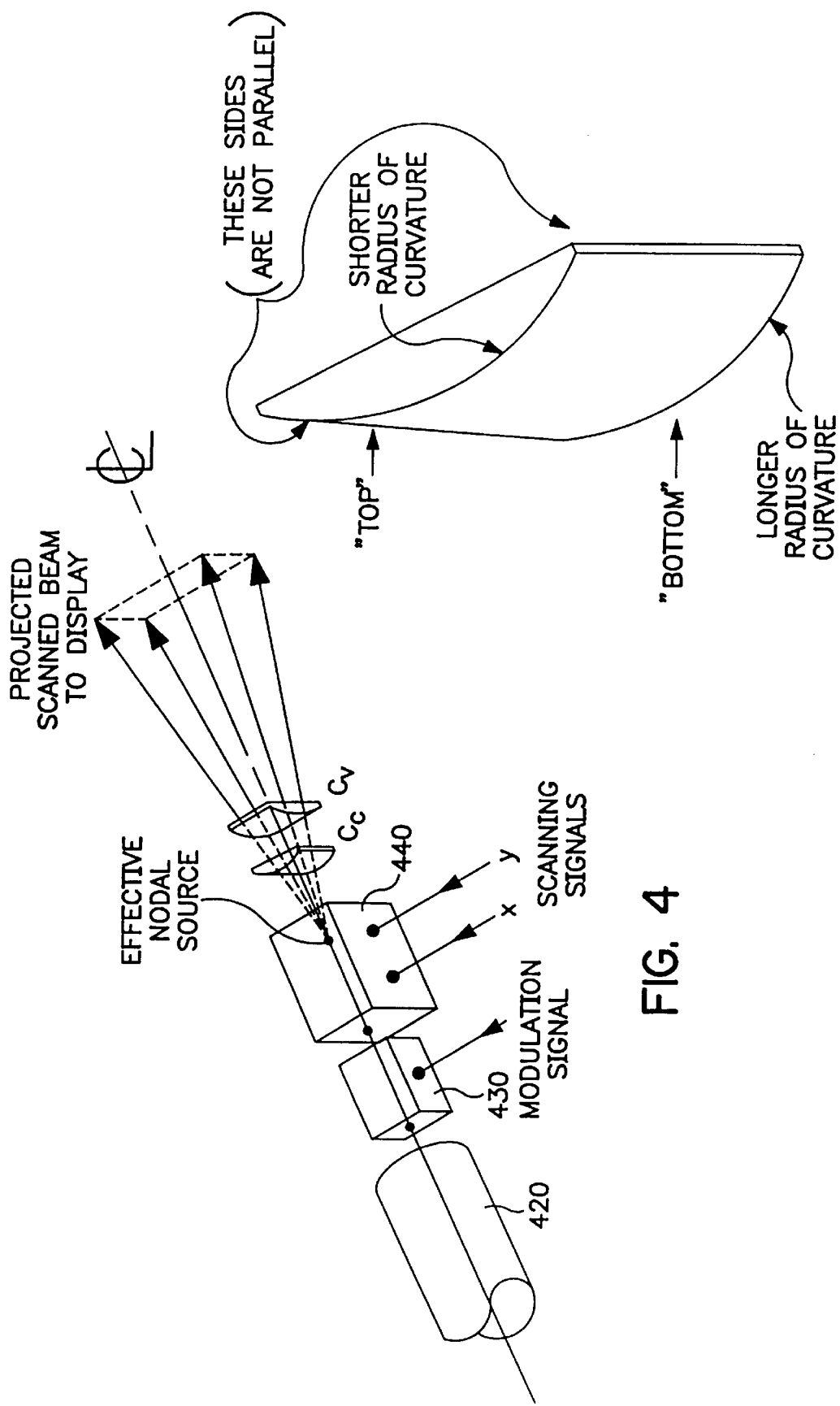

OPTICAL PROJECTION APPARATUS AND METHOD

RELATED APPLICATION

This application claims priority from U.S. Provisional Patent Application No. 60/027,966, filed Oct. 8, 1996, and said Provisional Patent Application is incorporated herein by reference.

The present invention was made with U.S. Government support, and the Government has certain rights in the invention.

FIELD OF THE INVENTION

This invention relates to the field of optical display and, more particularly, to an optical system and method for displaying an image. In one preferred form of the invention, an image is projected and displayed on a solid panel display device.

BACKGROUND OF THE INVENTION

In the field of image projection of a rectilinear object to a proportionately enlarged or reduced rectilinear image (as represented by conventional photographic enlargers and slide projectors), the entire image is projected typically upon a single plane (e.g., in the enlarger, to the photographic paper; and from the slide projector, to the screen). A more difficult task arises when an image must be projected into a display device having two separate image surfaces for the vertical and horizontal components of the image; each of which requires independent magnification and focus of the vertical and of the horizontal image components. The problem is further complicated when one of the image surfaces is tilted with respect to the projection axis; the tilt being so significant that conventional image focus will not be sustained along the full image surfaces. The two disparate image surfaces must be illuminated in such a manner that the vertical and the horizontal image components maintain independent focus along their respective tilted surfaces. Further, since projected images generally expand (or enlarge) over progressively greater projected field distances, tilted image surfaces are also subject to "keystoning", whereby one dimension (say, the horizontal "width") is enlarged progressively more as viewed from the "top" or the "bottom" of the image.

An example of a device which requires such image handling is represented in U.S. Pat. No. 5,381,502 entitled, "Flat or Curved Thin Optical Display Panel". FIG. 1 illustrates the type of panel construction described in the '502 patent. The panel comprises a stack of thin waveguide-like transparent lamina 111 each of typical thickness t. When the stack is cut at an acute angle S, each lamination exhibits a height h at the display surface such that h=t sec S. Thus, with S measuring typically about 70°, h is significantly larger than t. Also, the full display height H is larger than the base thickness T by the same factor, sec S.

The device of the '502 patent is called a "polyplanar optic display" (POD). The rightmost portion of the POD is represented primarily in FIG. 1 as an isometric view. The full width W is typically wider than its display height H. The portion which is detailed serves to describe the operation of the POD and is useful in understanding its relationship to the present invention. Each lamination (of thickness t) of the panel is a transparent sheet (glass or plastic) of nominal optical index of refraction $n_1$, separated by thin coatings of index of refraction $n_2$, where $n_1 > n_2$. Light entering the laminations at the base is separated into sheets and is confined to its respective sheets by total internal reflection at the interfaces. Thus, light focused at the base will retain "vertical" resolution elements of thickness t (in the "T"-direction) throughout its propagation "upward" to the display surface, where each thickness t is displayed as a corresponding resolvable height h. In the width W direction, however, there is no confinement of the input illumination, and each sheet propagates its respective slice (in the width direction) as would a continuous transparent medium. This requires that the horizontal image components be focused over varying distances corresponding to the tipped viewing surface. While the vertical component of the projected image must focus near the base, the horizontal information must focus near the sloping plane of the display surface; those components at the "bottom" of the display focusing close to the base, and those higher focusing at progressively greater distances to represent image elements approaching the top of the display. Also, while propagating through the lamina, the horizontal components expand progressively as an extension to the expanding illuminating field. Unless corrected, this generates keystoning, whereby (in this example) the top of the displayed image becomes wider than that at the bottom.

It is among the objects of the present invention to solve image handling problems of the type described above and also to provide image projection that can be used in conjunction with a POD type of display panel.

SUMMARY OF THE INVENTION

In one form of the invention, an optical system is disclosed for displaying an image of an object. A display device is provided and has an input surface and an output surface. Means are provided for illuminating the object so that light from the object is directed toward said input surface. Anamorphic optical means is disposed in the light path between the object and the input surface, the anamorphic optical means being operative to focus one directional component of the image at the input surface and to focus a different directional component of the image at the output surface.

In an embodiment of the invention, the display device is a panel device formed of a solid material and having disparate imaging surfaces for said different directional components, at least one of said imaging surfaces being non-perpendicular to the optical axis of the light. In this embodiment the object is a planar object tipped with respect to said optical axis by an angle that satisfies the Scheimpflug condition for said at least one of said imaging surfaces, the angle taking into account the refractive effect of the solid material on said light.

Also, in this embodiment a telecentric optical component can be disposed in the path of the light to correct for keystoning of said image.

Further features and advantages of the invention will become more readily apparent from the following detailed description when taken in conjunction with the accompanying drawings.

BRIEF DESCRIPTION OF THE DRAWINGS

FIG. 4 shows an embodiment of an apparatus and technique for practicing the invention using a scanning laser beam to form the image.

FIG. 4A illustrates a lens for providing focusing on a sloping image plane that can be used in the FIG. 4 embodiment.

DETAILED DESCRIPTION

Figure 2:
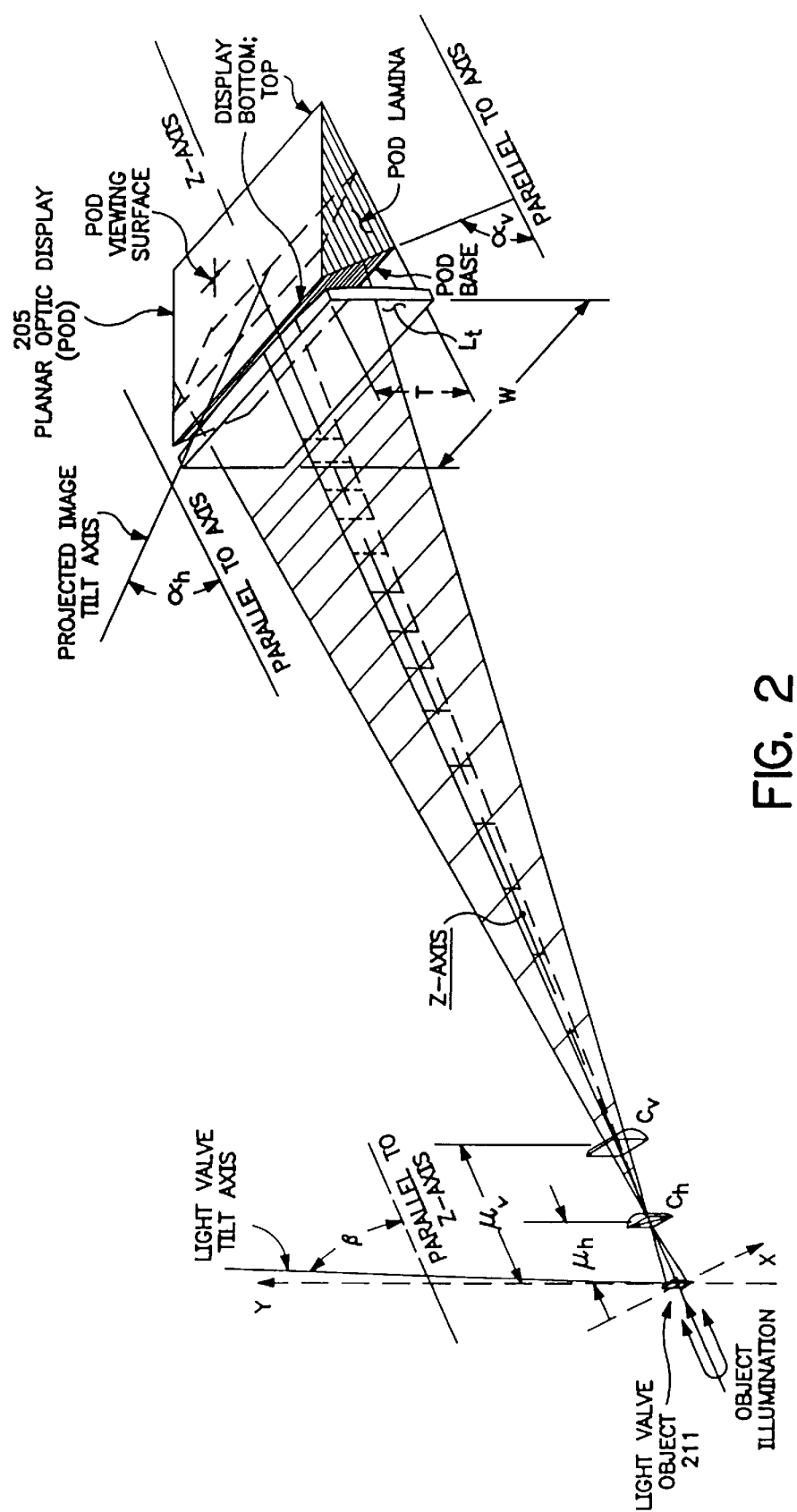
FIG. 2 is a diagram of the projected optical field, and the POD display, in accordance with an embodiment of the apparatus of the invention and which can be used in practicing an embodiment of the method of the invention.

IMAGE PROJECTION: To develop relationships between the object and its projected image, the entire projected field is represented in FIG. 2, with the POD 205 positioned such that the rays (propagating from left to right) remain "unfolded" until they arrive at the POD base. (If a "folding" reflective element is interposed in the ray path, the rays may be directed "upward" such that the POD can be positioned for typical upright viewing).

The principles hereof relate to the transfer of information from the object surface to the image surfaces of the POD. As such, the manner of illuminating the object is substantially independent of this optical transfer. The object will be assumed conventional; either transmissive or reflective; illuminated with incoherent or coherent light. One exception to this independence is the case of illumination of the POD by a scanned laser beam, wherein the "object" may be virtual; that is, contained in the software which addresses the laser beam intensity while it is scanned. This case will be discussed subsequently.

The object can be one of a variety of light valves which may be static for projection of a still picture (such as a photographic slide), or dynamic, forming moving images or changing data (such as by any of the electronically controlled light valves). Typically, the object is planar and it exhibits spatial information which is to be projected to a distant image surface. At the left side of FIG. 2 is illustrated a plane object "light valve" 211, oriented at the origin of an x-y-z coordinate system as shown, the object is tipped about the x-axis such that its plane forms an angle $\beta$ with the z-Axis. This will be discussed subsequently. Assuming a transmissive object, transmitted rays propagate to the right (in the z-direction), encountering anamorphic (cylindrical) lenses $C_h$ and $C_v$. Each lens provides optical power in only the horizontal or the vertical direction. The focal lengths of $C_h$ and $C_v$ are selected to satisfy the desired image distances and the required magnifications (from the object width to the display width W, and from the object height to the base thickness T of the POD). In an exemplary case, the required vertical magnification is $m_v$=6.1 and the horizontal magnification is $m_h$=18.5. The well-known "thin lens" relationship for the focal length f is given by $$f = \frac{uv}{u+v} = \frac{v}{m+1} \quad (1)$$

in which u is the object-lens distance, v is the lens-image distance, and m=v/u; the image/object magnification. In application for the differing image distances and magnifications of these systems, these and related equations are separated into quadrature directions (with subscripts h and v) to represent the independent horizontal and vertical image components.

FIG. 2 also shows a lens $L_t$ close to the POD, operating as a telecentric element to rectify keystoning. It is provided with a long focal length, whereby its focal point is positioned near the source of diverging rays (in the vicinity of $C_v$) so that it operates on the arriving diverging ray bundles to collimate them as they propagate into the POD. This additional optical power, positioned close to the focal regions in the POD, also shortens slightly the original focal lengths, as calculated per Equation 1 for $C_h$ and $C_v$ alone. Considerations for this and other factors relating to the development of the focal surfaces in the POD are now discussed.

The horizontal projection components must accommodate the tilting of the horizontal image plane in the POD (due to the differing propagation lengths within the lamina). The projected image surface of FIG. 2 (along the Tilt Axis) is determined by (subsequently described) successive calculation of the optical paths within the POD, allowing for appropriate depth of focus of the horizontal components. This reveals the effective tilt of the image plane which the incoming light must match to provide uniform horizontal focus over the entire image surface.

This is achieved by instituting the optical arrangement known as the Scheimpflug condition, established among the object plane, the image plane and the principal plane of the horizontal imaging lens $C_h$; accomplished by orienting these planes such that they intersect at a single line. That is, with the $C_h$ plane (thin lens approximation) normal to the projection axis and the effective image plane oriented as determined above, the object plane is tipped so that it intersects the intersection of the other two. This is represented by the Scheimpflug rule, $$\tan \beta = m \tan \alpha \quad (2)$$

where $\alpha$ is the image plane tilt angle, $\beta$ is the object plane tilt angle (both with respect to the axis) and m is the image/object magnification. This, too, is separated into quadrature directions with appropriate subscripts to represent the individual magnifications and $\alpha$-tilts. For thick or compound lens groups having pairs of principal planes, appropriate variation to the above thin lens procedure is implemented.

Figure 1:
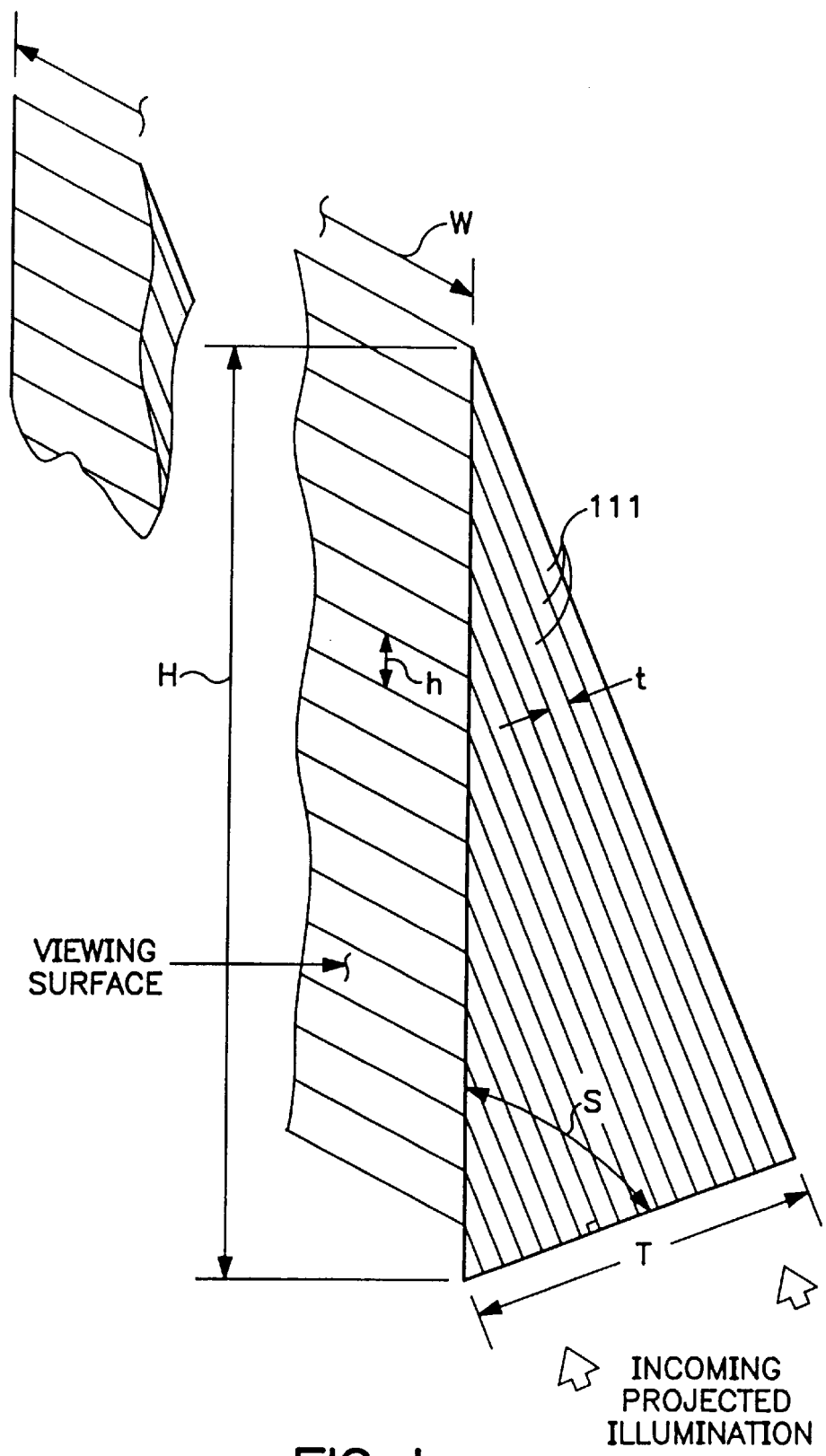
FIG. 1 is an isometric view, in partially broken away form, of a prior art POD display panel.
Figure 3:
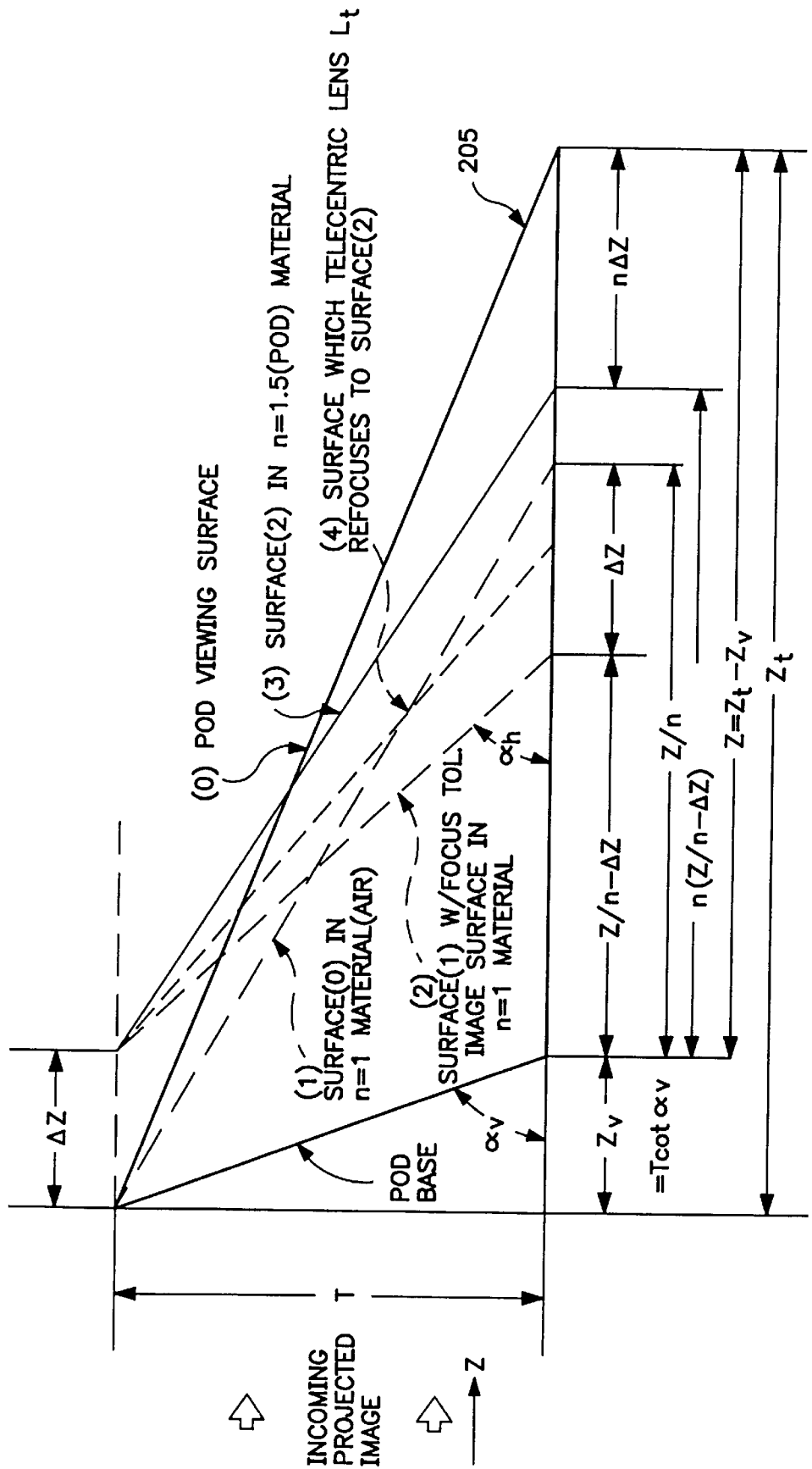
FIG. 3 shows a cross sectional view of a POD, and is useful in understanding determination of imaging surfaces and the determination of tilt.

LIGHT PROPAGATION WITHIN A TYPICAL POD: FIG. 3 is a section view of a generic POD (e.g. 205) and several (horizontal component) image surfaces. In this Figure, the width (or horizontal) dimension appears in-and-out of the plane of the paper. The axial dimensions are identified in the z-direction, as is the focal tolerance $\Delta z$. The POD base thickness T corresponds to that in FIGS. 1 and 2. Illumination, propagating from left to right, traverses the keystone-correcting lens $L_t$ (not shown) and encounters the sloping base of the POD. This $\alpha_v$ tilt is determined by application of Equation (2) for the vertical component, after iterative determination of the tilt of the horizontal image surface $\alpha_h$ and the tilt of the object plane $\beta$. $\alpha_v$ is taken generally as the angle between the illumination axis and the POD base; e.g., the POD may be tipped to refract the illumination efficiently into the lamina. The locations and effective tilts of the horizontal image surfaces are established following the sequence of lines numbered (0) to (4), as follows:

Line (0) is the viewing surface of the POD; as illustrated in FIGS. 1 and 2. This surface and the total axial distance $Z_t$ remain the same, independent of the base tilt $\alpha_v$. (Note that in FIG. 1, there is shown no base tilt; i.e., $\alpha_v$=90°.)

Line (1) is the corresponding focal surface in n=1 refractive index material (air). In typical n=1.5 material (glass, plastic), it is extended by 1.5× to the viewing surface, line (0). This type of consideration allows the optical system to be calculated as though the image distances are completely in air.

Allowing ±Δz focal tolerance in air at the ends of line (1) forms line (2), the design focal surface which will image effectively on to the ideal line (1). This reduces significantly the slope of the image plane and the corresponding Scheimpflug tilt of the object plane. The image tilt $\alpha_h$ is established at line (2).

Line (3) is the focal surface inside the n=1.5 material, resulting from focusing on line (2) in air. Note that the Δz near the Base (top left) remains in air, while at the other end (bottom right) it extends to nΔz inside the material.

Finally, line (4) is determined analytically as the surface to which cylinder lens $C_h$ must be focused such that with the additional keystone correcting lens $L_t$, the image distance is shortened slightly to line (2) in air. It is then (per above) extended inside the higher index POD material to line (3).

FOCUS AND KEYSTONE CORRECTION: With the horizontal image tilt angle $\alpha_h$ established at line (2) of FIG. 3, one can now determine the object tilt angle β by application of Equation (2), given $m_h$. This provides horizontal component focus over the entire plane of line (2). [Line (2) is on the surface identified in bold dashed lines on the Projected Tilt Axis of FIG. 2.] Then, by re-application of Equation (2) for the known $m_v$, one determines the base tilt angle $\alpha_v$ in FIG. (3) for vertical focus over the entire POD base. Vertical focus is then transported via the waveguides to the viewing surface, and joined by the above-described horizontal components as a fully focused image.

To determine $f_h$ (the focal length of $C_h$) per Equation (1), $v_h$ is taken to the vertical center of line (4) in FIG. 3; effectively before the addition of telecentric lens $L_t$ refocuses line (4) to line (2). Also, for calculation of $m_v$ before the addition of $L_t$, the image width is taken as greater than W by the ratio of $v_h$ to the distance from $C_h$ to $L_t$. When $L_t$ is added, it is to collimate the principal rays of the focusing beams to width W. The focal length of $L_t$ would normally be taken as the distance from $C_h$ to $L_t$ if there were no β-tilt of the object. With tilt, however, minor additional keystoning develops; accommodated by reducing the focal length of $L_t$ appropriately. Numerically, for an exemplary design, its focal length is shortened by approximately 12% to provide a rectilinear focused image.

PROJECTION OF SCANNED LASER BEAM(S): An alternate method of illuminating and addressing a POD-type display device, as expressed earlier, is by scanning a laser beam (or beams) in typical raster or line segment format, while modulating the intensity (or intensities) of the beam (s), and projecting the appropriately focusing array of beams into the display device to form an image. This is a relatively conventional "laser projection system" in which a display screen is mounted typically perpendicular to the projection axis. However, in this display system, the vertical and horizontal image surfaces are not only disparate, but may be tilted with respect to the axis. Also, there is normally no "real" plane object (as in the above described systems) which may be placed into the Scheimpflug condition to render the focus uniform. This "virtual" object exists only in the video signal. Furthermore, even if the depth of focus (later defined) is sufficiently great to accommodate the differing image distances, keystoning would develop, unless compensated.

To resolve this situation, it is first assumed that the laser beam scanning process is well implemented, following well known x, y, z, t (t=time) raster or segment scanning and intensity modulation procedures. The scanned image can be considered for this application as integrated over time into a stationary image. An analog to this process is, therefore, that of a photographic slide projector, as viewed from the principal plane of the projection lens to the screen. Everything before the lens is replaced by the scanned and modulated laser beam. The vertical and horizontal scan magnitudes can also be adjusted to satisfy differing requirements for vertical and horizontal image magnifications.

To adapt to laser operation, the above projection lens is identified as a "scan lens" of laser scanning vernacular. If the desired image spot size δ is so small as to require an f-number F of the converging beam which is too low for its depth of focus Δz to straddle the disparate horizontal and vertical image planes, as governed by the relations, $$F \sim \delta/\lambda \text{ and } \Delta z \sim \pm F^2\lambda \qquad (3a \& 3b)$$

then this lens may be anamorphic. It is implemented with lens elements similar to $C_h$ and $C_v$ of the earlier discussions, whereby the horizontal and vertical image components focus over different distances. With nominal focal distances established in a manner represented in FIG. 3, and with horizontal and vertical laser beam scan angles into the lens determining width W and thickness T respectively, the specification of an appropriate projection lens is straightforward.

An alternative which maintains a more conventional flat field projection lens is to make the beam which illuminates the scanners appropriately astigmatic, such that the subsequently-scanned horizontal and vertical image components are projected to their proper disparate image planes. This is accomplished by placing an anamorphic lens element into the beam before the scanners.

In either of the above two cases, if the image display planes are perpendicular to the axis, image geometry and focus would be satisfied completely. A tilted horizontal image focal plane requires, however, compensation for keystoning and its possible focal disparity toward the top and bottom of the image.

Keystoning can be controlled in a manner discussed earlier; by adding a telecentric lens $L_t$ per FIG. 2, to collimate the principal ray groups and to focus them at the center of line (2) of FIG. 3. The focal length of $L_t$ is determined by its distance to the effective nodal source of the projected beam. Keystoning can also be nulled by predistorting the scanned function such that it forms a keystoned image which is complementary to that which would otherwise appear on the tilted display screen. This may be done by addressing low inertia laser scanners (e.g., acousto-optic or galvanometer deflectors) which are well known in the art to respond to variable rate electronic drive. This leaves only the correction of defocus (if required) appearing near the top and the bottom of the display. FIG. 4 shows laser 420, intensity modulating components 430, beam scanning components 440, and lens components $C_c$ and $C_v$.

Unable to invoke the Scheimpflug condition here (since there is no object plane), a method of providing focus on a sloping image plane, as illustrated in FIG. 4, is to replace cylindrical lens $C_h$ (e.g. of FIG. 2) with a lens of conic cylindrical shape, $C_c$; one shaped so that it reduces optical power gradually from "top" to "bottom". It is essentially a small portion of a (solid glass or plastic) cone which is cut therefrom such that its radius of curvature increases gradually from top to bottom, as shown in FIG. 4a. This reduces optical power from top to bottom, gradually increasing horizontal focal length to match the tipped horizontal image plane as the scanned beam shifts vertically and propagates through the lens from top to bottom.

Another alternative which allows the laser scanned system to act more like that described earlier and illustrated in FIG. 2, is to create a synthetic object plane which may be tilted for Scheimpflug correction. This synthetic plane can be formed by having the laser scanner develop a real image in space; located essentially as is the Object in FIG. 2. The imaging process of FIG. 2 may be duplicated by converging and propagating the flux through the lenses.

While this disclosure identifies basic optical elements which in combination satisfy the objectives of the invention, it is understood that designs may be conducted by one skilled in the art to establish characteristics which satisfy such factors as variable (zoom) magnification, tilted optical axis, aberration reduction, optical efficiency, and production effectiveness. It is also understood that variations to the basic disciplines expressed here, such as the use of telephoto, reverse telephoto, combined symmetric and anamorphic lens elements, folding reflective and/or compound or cemented optical elements which may have equivalent Fresnel, reflective, diffractive or hybrid optical elements, remain within the scope of the principles of this invention.

I claim:

1. An optical system for displaying an image of an object, comprising:
   a display device having an input surface and an output surface;
   means for illuminating an object so that light from the object is directed toward said input surface;
   optical means disposed in the light path between said object and said input surface, said optical means being operative anamorphically to focus one directional component of the image at said input surface and to focus a different directional component of the image at said output surface.

2. The optical system as defined by claim 1, wherein said display device is a panel device formed of a solid material and having disparate imaging surfaces for said different directional components, at least one of said imaging surfaces being non-perpendicular to the optical axis of the light, and wherein said object is a planar object tipped with respect to said optical axis by an angle that satisfies the Scheimpflug condition for said at least one of said imaging surfaces, said angle taking into account the refractive effect of said solid material on said light.

3. The optical system as defined by claim 1, further comprising a telecentric optical component disposed in the path of said light to correct for keystoning of said image.

4. An optical system which includes a planar object, projection lens elements at least one of which is anamorphic, and a display viewing device having differing vertical and horizontal image receiving surfaces, said planar object being illuminated such that light therefrom is projected toward said display device via said lens elements which distribute the vertical and the horizontal components of the image anamorphically to their respective size and depth locations in the display device.

5. An optical system disposed along an optical axis which includes a planar object, projection lens elements at least one of which is anamorphic, and a display viewing device having differing vertical and horizontal image receiving surfaces having differing image size requirements, at least one of which surfaces is disposed at an angle which departs from 90° with respect to said optical axis, said planar object being illuminated such that light therefrom is projected toward said display device via said lens elements whose at least one anamorphic lens element distribute the vertical and the horizontal image components to their respective size and depth locations in the display device; said planar object so tipped with respect to said optical axis that the Scheimpflug condition is satisfied among the angles made to the optical axis by the object and at least one of the image receiving surfaces of the display device.

6. An optical system as defined by claim 4, in which at least one of the anamorphic optical elements is cylindrical.

7. An optical system as defined in claim 5, which includes a positive lens element operating telecentrically such that its front focal point is positioned in the vicinity of the nodal source of rays diverging from said projection lens elements, said telecentric lens element serving to correct for keystoning of the displayed image by converging the diverging principal rays in image space to be nominally parallel to said optical axis.

8. An optical system as defined by claim 5, in which the image which is projected to at least one of the image receiving surfaces is positioned to depart from the actual viewing surface accommodating, thereby, tolerable depth of focus.

9. An optical system as defined by claim 5, in which the display device requires differing image projection magnifications which are accommodated by the selection of the focal lengths and locations of the projection lens elements.

10. An optical system as defined by claim 5, in which the display device requires differing image projection magnifications which are accommodated by the selection of the focal lengths and locations of the projection lens elements which differing anamorphic magnifications contribute to the determination of the Scheimpflug tilt angles.

11. An optical system which includes a laser, beam shaping and intensity modulating components, beam scanning components and image projection lens elements at least one of which is anamorphic, together forming and projecting the laser light toward a display viewing device having vertical and horizontal image receiving surfaces which differ in depth, whereupon the projection lens elements distribute and focus the vertical and the horizontal components of the image to their respective depth locations in the display viewing device.

12. An optical system which includes a laser, beam shaping and intensity modulating components, at least one anamorphic lens element, beam scanning components and image projection lens elements, together forming and projecting the laser light toward a display viewing device having vertical and horizontal image receiving surfaces which differ in depth, whereupon the at least one anamorphic lens element forms an astigmatic beam having the required different focal depths of the vertical and horizontal image components such that subsequent beam scanning and image projection conveys the predetermined different focal depths to their respective vertical and horizontal depth locations in the display viewing device.

13. An optical system disposed along an optical axis which includes a laser, beam shaping and intensity modulating components, beam scanning components and image projection lens elements at least one of which being anamorphic, together forming and projecting the laser light toward a display viewing device having vertical and horizontal image receiving surfaces which differ in depth and at least one of which surfaces departs from 90° with respect to said optical axis, said at least one anamorphic projection element formed as a conic cylinder having optical power which varies vertically across the element, adjusting thereby the focal length vertically to provide optical focus across said at least one image surface which depart from 90° with respect to said axis.

14. An optical system as defined by claim 11, disposed along an optical axis, a display viewing device in which at least one of the image receiving surfaces is oriented at an angle which departs from 90° with respect to said optical axis, and a positive lens element operating telecentrically such that its front focal point is positioned in the vicinity of the scanned source of the projected beam, said telecentric lens element serving to correct for keystoning of the displayed image.

15. An optical system as defined by claims 11, disposed along an optical axis, a display viewing device in which at least one of the image receiving surfaces is oriented at an angle which departs form 90° with respect to said optical axis, while said beam scanning components are so addressed to form a keystoned image which is complementary to that developed by said tilted receiving surface, correcting thereby the keystoning of the displayed image.

16. An optical system disposed along an optical axis which includes a laser, beam shaping and intensity modulating components, beam scanning components and image forming lens elements, which together develop a first real image in space whose focal plane is tipped at the prescribed Scheimpflug angle with respect to said axis, along which axis are disposed projection lens elements at least one of which is anamorphic, and a display viewing device having differing vertical and horizontal image receiving surfaces, at least one of which is tipped with respect to said axis, and light from said first planar image propagating through said projection lens elements whose anamorphic portions distribute the vertical and the horizontal components of the image to their respective depth locations in the display device such that the Scheimpflug condition is satisfied between the said first image and the displayed image.

17. An optical system as defined by claim 16, which includes a positive lens element operating telecentrically such that its front focal point is positioned in the vicinity of the nodal source of rays diverging from said projection lens elements, serving to correct for keystoning of the displayed image.

18. An optical system as defined by claim 16, whose beam scanning components are so addressed to form a keystoned image which is complementary to that developed by said tilted receiving surface, correcting thereby the keystoning of the displayed image.

19. An optical system as defined by claim 11, in which at least one of the anamorphic optical elements is cylindrical.

20. An optical system as defined by claim 11, in which the display device requires differing image projection magnifications which are accommodated by the selection of focal lengths and locations of the projection lens elements.

21. An optical system as defined by claim 11, in which the display device requires differing image projection magnifications which are accommodated by the adjustment of vertical and horizontal scan angle magnitudes.

* * * * *